Patented Aug. 26, 1924.

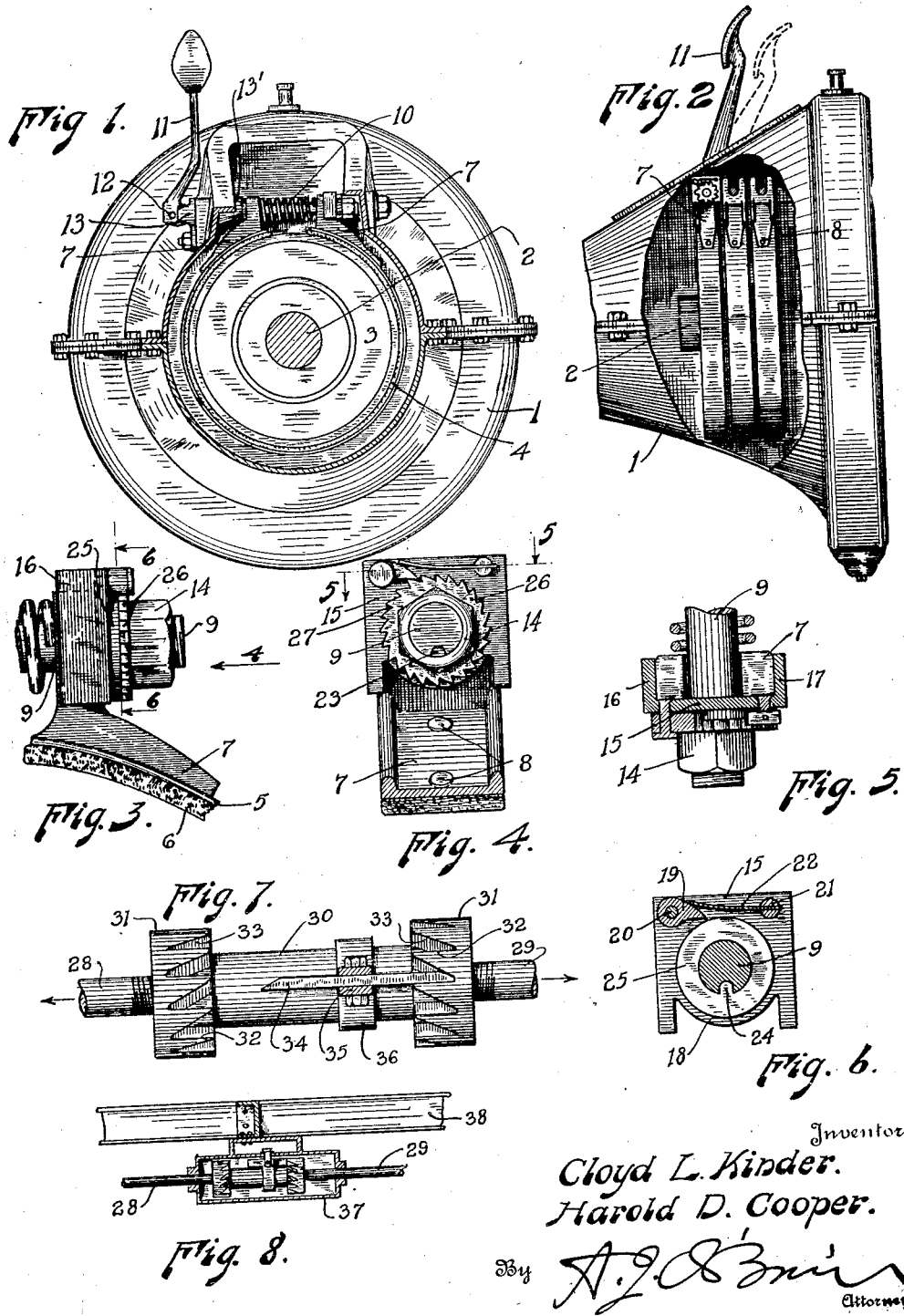

1,506,490

UNITED STATES PATENT OFFICE.

CLOYD LELAND KINDER AND HAROLD D. COOPER, OF DENVER, COLORADO, ASSIGNORS, BY DIRECT AND MESNE ASSIGNMENTS, TO THE A. C. SMITH MANUFACTURING COMPANY, A CORPORATION OF COLORADO.

AUTOMATIC TAKE-UP DEVICE FOR BRAKES.

Application filed August 28, 1922. Serial No. 584,744.

*To all whom it may concern:*

Be it known that we, CLOYD LELAND KINDER and HAROLD D. COOPER, citizens of the United States, residing at the city and county of Denver and State of Colorado, have invented certain new and useful Improvements in Automatic Take-Up Devices for Brakes; and we do declare the following to be a full, clear, and exact description of the invention such as will enable others skilled in the art to which it appertains to make and use the same, reference being had to the accompanying drawings, and to the characters of reference marked thereon, which form a part of this specification.

This invention relates to automatic take-up devices and has special reference to means for automatically adjusting an automobile or other brake so as to maintain the adjustments in a predetermined manner, regardless of wear.

In vehicles, especially those propelled by an internal combustion engine or an electric motor, and particularly in automobiles, it is essential to safety that the brakes shall always be properly adjusted. In a hilly or mountainous country, where there are long, steep hills to descend, the wear on the brakes is so great that it often happens that the driver must stop and tighten them while en route, which is very unpleasant as it requires parts to be handled that are usually greasy and dirty.

It is the object of our invention to provide a mechanism that can be incorporated in the construction of brake mechanisms or which can be applied directly to existing brake mechanisms and which will act to automatically maintain the brake properly adjusted.

In the accompanying drawing, we have shown our invention embodied in an attachment adapted to be applied to the brake and the reverse transmission bands on a car employing the planetary gear construction. Our invention, however, is adapted to be used on other types of brakes and in connection with other machines and mechanisms. In fact, our invention can be employed in a variety of places where a member subject to wear is to be maintained in proper adjustment.

In order to more clearly describe our invention, we shall have reference to the accompanying drawing, in which Fig. 1 is an end view of a planetary transmission, with our automatic adjusting means applied to one of the transmission bands;

Fig. 2 is a side elevation of the parts shown in Fig. 1, with part of the transmission casing broken away to show the transmission bands;

Fig. 3 is a side elevation of one end of a transmission band showing our adjusting means in place thereon;

Fig. 4 is a side elevation of the parts shown in Fig. 3, looking in the direction of arrow 4;

Fig. 5 is a section taken on line 5—5, Fig. 4;

Fig. 6 is a section taken on line 6—6, Fig. 3;

Fig. 7 is a side elevation of a modified form of our invention showing how the same can be applied to ordinary brake rods; and Fig. 8 is a view on a smaller scale showing the form illustrated in Fig. 7 applied to an automobile.

The same reference characters will be employed to indicate the same parts throughout the several views.

Numeral 1 represents a transmission casing, and 2 the drive shaft of an automobile, while 3 represents the brake drum, which is non-rotatably secured to the shaft. Co-operating with the drum 3 is a brake band 4, which consists of a metal band 5 having a fibrous lining 6 which co-operates with the outer surface of the brake drum. Each end of the band has a lug 7 secured thereto by rivets 8. The lugs 7 are slotted to receive a bolt 9, and a compression spring 10 surrounds the bolt and has its ends abutting the adjacent surfaces of the lugs in the manner shown in Fig. 1. Bolt 9 extends through the transmission cover and has applied thereto a pedal 11, which is held in place by a pin 12 or other equivalent means. Secured to the side of the transmission cover is a part 13 that co-operates with suitable portions on the pedal to move the bolt to the left as the pedal is moved forwardly to the dotted line position in Fig. 2. The left-hand lug 7 abuts a part 13' of the transmission cover and this prevents the band from rotating in a counterclockwise direction. A nut 14 is secured to the end of bolt 9. It is evident that when the pedal 11 is moved forwardly, the bolt 9 moves towards the left and contracts the band 4 about drum 3 and acts as a brake. The above described mechanism is old and well known and forms part of the transmission of a popular low-priced car.

As the lining 6 of the brake bank wears, the pedal 11 has to be moved farther and farther ahead to secure the desired braking action, until at last the brake ceases to become effective when the nut 14 has to be tightened so as to move the lugs 7 closer together. Our invention relates to a very simple means that can be applied directly to the bolt 9 between the lug 7 and the nut 14, and which will automatically rotate the nut so as to keep the adjustment of the brake practically the same at all times during the life of the lining 6. We take a member 15 which has its ends 16 and 17 bent at right angles to the main body portion thereof, so as to engage the sides of the lug 7 in the manner shown in Fig. 5. The lower side of member 15 is curved, as indicated at 18, so as to obtain a sufficient amount of metal on the sides of the hole through which the bolt 9 passes. In the upper left-hand corner of member 15 we pivot a pawl 19 on a pin 20, and in the upper right-hand corner we secure a pin 21, which is transversely split and adapted to receive a spring 22, which rests upon the pawl 19 and tends to move it in a clockwise direction about pin 20. Other arrangements of spring and pawl can, of course, be used, but the above is a practical one and submitted as an illustration.

The bolt 9 has a longitudinal groove or channel 23 which co-operates with the inwardly projecting portion 24 on the washer 25 to prevent the latter from rotating with respect to the bolt. The nut 14 is provided at its inner end with an outwardly extending flange 26, which has a series of ratchet teeth 27 thereon which are adapted to co-operate with the pawl 19 in the manner shown in Fig. 4. We have shown 24 ratchet teeth and find that this number works satisfactorily, but the exact number is not material, as one or two more would not make the device inoperative. We have found that if the pedal 11 has a movement of approximately fifteen (15) degrees between off and on position, that the operation is satisfactory, and even a few degrees less than this will do, while a movement of over fifteen (15) degrees is excessive. We have therefore spaced the ratchet teeth fifteen (15) degrees apart. Since the washer 25 rotates with the bolt 9, the nut 14, which is secured to the bolt and rests on the washer 25, will also rotate with the bolt unless restrained by some means. The pawl 19 remains fixed and is so adjusted that the nut may freely rotate in a clockwise direction (Fig. 4), and as long as the rotation is less than fifteen (15) degrees, the pawl will remain in the same tooth, but when the brake has worn to such an extent that the movement of the pedal 11 and bolt 9 exceeds 15 degrees, then the pawl will engage the next tooth, and as the pedal moves backwards to "off" position the pawl will keep the nut from rotating and this will turn the nut onto the bolt a distance equal to one twenty-fourth of the pitch of the threads. If the movement was sufficient to compensate for the wear, the next "on" position will not require a fifteen degree movement of the pedal, but if it was not sufficient, the movement will exceed this and the pawl will engage the nut and rotate it another notch. It is apparent that when our adjusting means is employed, the brake will automatically adjust itself so as to compensate for wear.

The apparatus described above is suitable for machines having bands operated by rotating bolt only, and as some machines have brakes that are not so operated, we have shown in Figs. 7 and 8 how the principle described above can be applied to the brake rods so as to automatically shorten the same as the brake wears. 28 and 29 indicate the two parts of a brake rod which are usually connected by a turnbuckle. Rod 29 has a left-hand thread and rod 28 a right-hand thread, and co-operating with these threaded ends is a turnbuckle 30, which has an outwardly extending flange 31 at each end. Flanges 31 are toothed on their adjacent sides, the teeth being formed with one side 32 parallel to the axis and the other side 33 inclined, as shown, the teeth on the opposing flanges being offset half the pitch of the teeth. A bar 34 is firmly clamped to a bar 35, which is rigidly secured to the chassis and has one end provided with a sleeve 36 that slides freely on the central portion of the turnbuckle. When the brake is "off," the parts occupy the position shown in Fig. 7, and the parts are so proportioned that when the brake is properly adjusted the teeth on the left-hand end of turnbuckle 30 do not engage the bar 34, but as the brakes wear the movement to the right will increase until at last the left-hand teeth will engage the bar and rotate the member 30 slightly, and when the brakes are returned to "off" position, the right-hand end of the bar will engage a new tooth and further rotate the member 30. In Fig. 8 we have shown the parts described in position on a car and enclosed in a housing 37, which may contain oil. Member 38 represents the chassis frame.

From the above it is apparent that we have devised a means that will automatically adjust the brakes of an automobile so as to compensate for wear and which will therefore save the owner considerable expense and annoyance, and besides this, it will act as an accident preventer, as many accidents are due to defective adjustment of the brakes.

Having now described our invention, what we claim is:

1. An article of manufacture comprising a member having a channel-shaped cross section, an opening centrally thereof, a pawl pivoted to said member, and a spring cooperatively connected to said pawl and tensioned to move the end of the pawl towards the opening.

2. In combination a transmission band having lugs at each end thereof, an adjusting means associated with one of said lugs, said means comprising a member having a channel-shaped cross section, the flanges of which are adapted to fit the sides of the lug, an opening in the web of said member, a pawl pivoted thereto and a spring connected to said pawl and said web for moving said pawl about its pivot.

3. In combination a rotating drum, a brake band surrounding said drum, a lug on each end of said band, means engaging one lug and holding the band against turning, the other lug being movable with respect to the last named lug, a bolt passing through said lugs, a spring surrounding said bolt and engaging said lugs for the purpose of expanding said band, means for rotating said bolt and for simultaneously moving the same in the direction of its axis, a nut on the end of said bolt and adapted to be rotated thereon to adjust the ends of the band to compensate for wear, and means for rotating said nut on the bolt a predetermined amount at each time the brake is operated whenever the wear is sufficient to permit the bolt to rotate beyond a predetermined amount, said means comprising a channel-shaped member whose flanges engage the sides of one of said lugs, and a pawl operatively connected thereto.

In testimony whereof we affix our signatures.

CLOYD LELAND KINDER.
HAROLD D. COOPER.